United States Patent [19]
Grossman, Felix T. et al.

[11] Patent Number: 5,152,860
[45] Date of Patent: Oct. 6, 1992

[54] MODULAR COMPOSITE STRUCTURE AND METHOD

[75] Inventors: Grossman, Felix T., Encino, Calif.; David Stein, Mansfield, Tex.

[73] Assignee: Anadite, Inc., Hurst, Tex.

[21] Appl. No.: 658,561

[22] Filed: Oct. 9, 1984

[51] Int. Cl.[5] ............... B32B 5/12; B32B 31/00
[52] U.S. Cl. .................. 156/173; 156/161; 156/163; 156/176; 156/330; 156/429; 269/564; 428/114
[58] Field of Search ............. 264/555, 564; 156/624, 156/626, 162, 196, 330, 429, 664, 173, 114, 161, 163

[56] References Cited
U.S. PATENT DOCUMENTS

| | | | |
|---|---|---|---|
| 4,323,623 | 4/1982 | Ahrens et al. | 428/246 |
| 4,402,778 | 9/1983 | Goldsworth | 156/172 |
| 4,420,359 | 12/1983 | Goldsworthy | 156/172 X |
| 4,514,471 | 4/1985 | Sugimoto et al. | 156/39 X |
| 4,591,400 | 5/1986 | Fradenburgh et al. | 156/80 |
| 4,617,072 | 10/1986 | Merz | 156/89 |

Primary Examiner—Peter A. Nelson
Attorney, Agent, or Firm—Robert A. Felsman

[57] ABSTRACT

A method of constructing fibrous composite material, and a resulting structure, having a modular construction in which the modules are formed on mandrel assemblies having a metal core and an elastomeric, deformable and removable sheath. Fibrous composite material is wrapped around each sheath, which in a complex shape such as a thrust reversing cascade for a jet engine, has sets of similar modules arranged in rows across layered composite ribs and in columns in which the modules are mutually engaged. When bonded by heat and pressure, the epoxy matrix of the composite material joins the ribs and the modules into a structure of high strength. In a cascade configuration a slotted medal plate is bonded to the ribs and the modules, being positioned in slots in the plate, with modules positioned fore and aft of the plate to increase the bonding area.

9 Claims, 3 Drawing Sheets

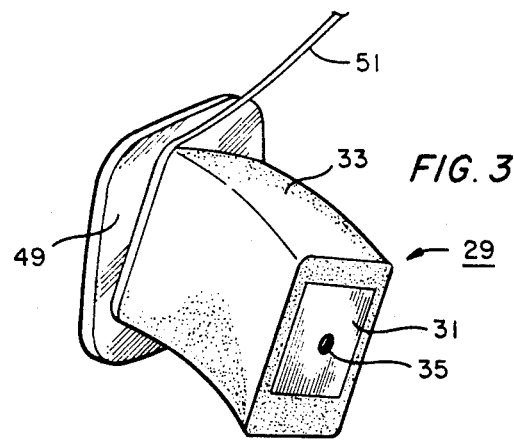
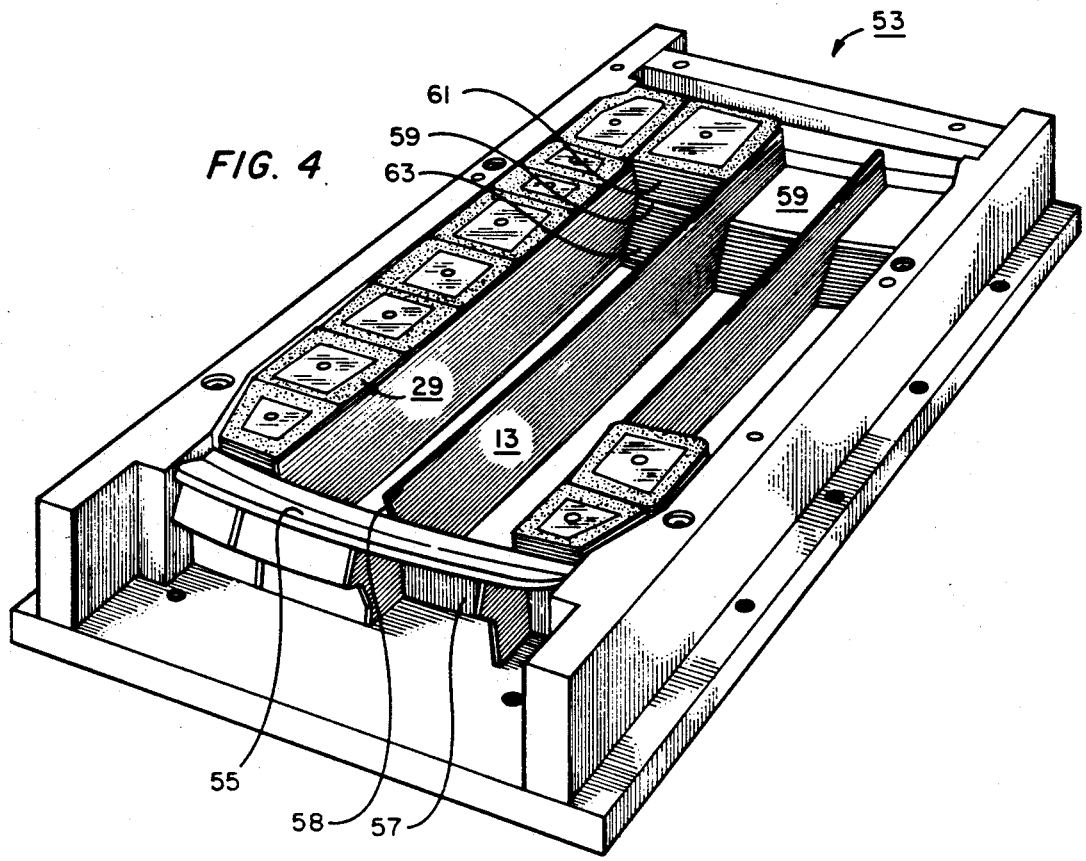

MODULAR COMPOSITE STRUCTURE AND METHOD

BACKGROUND OF THE INVENTION

1. Field of the Invention

This invention relates to methods and structures known in general as fiber reinforced plastics, but more specifically as "advanced fibrous composites", which are strengthened with heat and pressure, usually in a vacuum, during a curing cycle for the production of low density materials requiring exceptional strength and stiffness.

2. Background Information

Fiberglass embedded in an epoxy matrix has been used in the manufacture of aircraft since 1940, initially in structure intended to carry light loads. As early as the late 1950's, Dr. Leo Windecker conceived and built a number of general aviation aircraft known commercially as the "Eagle", using almost entirely fiberglass-epoxy. The skins were the primary structure of the aircraft and were composed of one or more plies of nonwoven unidirectional fiber tape oriented for optimum load carrying capacity The wing spars and other laminates were composed of multiple oriented plies of fiber cloth. The resin system consisted of a Bisphenol-A epoxy resin, amine curing agents, and a silane coupling agent.

The Eagle still flies today, with a remarkable record of endurance and maintenance free performance, an indicator of the future of aviation.

By early 1981 the large commercial aircraft companies had made large strides in the use of "advanced fibrous composites". Boeing, as one example, has used composites on their commercial airplanes since the early 1960's. By 1981 advanced fibrous composites were in use in the Models 767 and 757, including fibers of graphite, Kevlar and graphite/Kevlar hybrids fabricated into skins for rudders, elevators, spoilers, ailerons, gear doors, fixed trailing edges, fairings and engine cowls. As a result, there is a weight savings of 25-30 percent in a Model 747 and annual fuel savings of about $750,000.

Initially liquid resin was poured onto glass fabric in the design configuration, then spread to impregnate the fabric. The component was placed in a subsequently evacuated bag prior to curing in an autoclave, a labor intensive and expensive procedure. Major cost savings were realized after the development of pre-impregnated fibers with epoxy resin, materials called "prepregs", which have uniformity of resin content and yield uniform properties. Improvements in the prepreg materials have made possible precision curing cycles yielding uniform composites with greatly improved properties along with additional reductions in material and labor costs.

Initial honeycomb core materials at Boeing were polyester and nylon-phenolic. Later heat resistant phenolic core was used, and more recently "Nomex". A typical structural fiberglass panel has upper and lower fiberglass skins and doublers and honeycomb core. "Tedlar" is normally applied to the upper skin as a moisture barrier. Areas of high localized loading have titanium inserts, while antenna grounding and lightning strike protection is provided by a sprayed aluminum coating or bonding aluminum foil on composite surfaces.

The scope of the advance in composite technology is seen in the successful use of rotor blades of composite materials by all of the manufacturers of helicopters. The blades use spars stiffened with graphite, combined with titanium on the leading edges and hubs, in a hybrid of metal and composites of exceptional strength and reliability.

Construction of structural members of fibrous composites requires movement into more complex shapes and methods. The use of a elastomeric interior mold, which is pressurized for rigidity while curing the composite has been one approach to the formation of complex shapes such as hollow ducts for such use as ram air intakes of aircraft. Another approach to complex composite structures involves the use of meltable cores as a removable mandrel around which composites are positioned to form hollow and parallel multi-ducted channels for the interior of a radome. This enables the circulation of warm air in the channels to de-ice the exterior of the radome. Silicone rubber mandrels having a metal core such as a flexible cable that is removable to permit deformation of the rubber and displacement from the interior of a hollow composite beam have also been used to manufacture radomes. Also, a variety of processes and machines have been used to lay composite tape and fabric in complex shapes as well as to filament-wind roving.

Even though there have been impressive strides in the use of composites and in the methods and techniques to form increasingly complex structural shapes, there exists the need for manufacturing methods and structures which can effectively take advantage of the physical and mechanical properties and manufacturing flexibilities which are characteristic of advanced fibrous composites.

SUMMARY OF THE INVENTION

The object of this invention is to provide an improved method and fibrous composite structure which can have a variety of complex shapes, manufactured with relative ease and flexibility. The method utilizes a modular construction in the use of modules of fibrous composites formed around mandrel assemblies, each having a removable rigid core and a distortable and removable elastomeric sheath, around which is wrapped the composite material. The modules are grouped and positioned in a fixture such that a module engages the sidewall of an adjacent, preformed and rigid rib and the ends of the adjacent modules. In the more complex structures, such as the thrust reversing cascade for a jet engine, the modules are grouped into sets which forms rows across the ribs, and columns along the ribs, to achieve a predetermined thrust reversing pattern with the cascade. The modules and the ribs are heated in an evacuated bag during the application of pressure to bond adjoining modules to adjoining ribs. In a cascade a portion of a metal plate is slotted to receive the ribs, with modules being positioned for and aft of the metal to increase the the bonding area between metal and the composite material to form a hybrid metal-composite structure of exceptional strength, yet one that may be conveniently and economically manufactured.

Additional objects, features and advantages of the invention may be seen with reference to the following description.

DESCRIPTION OF THE DRAWINGS

FIG. 3 is a perspective view of a mandrel assembly being wrapped with a pre-impregnated roving of fiber and epoxy.

FIG. 4 is a perspective view of a fixture which includes some, but not all, of the mandrels wrapped with composite material, layered composite ribs to segregate the modules into columns, and a metal plate as one component of the hybrid composite cascade to be formed through use of the fixture.

DESCRIPTION OF THE PREFERRED EMBODIMENT

Figure 1:
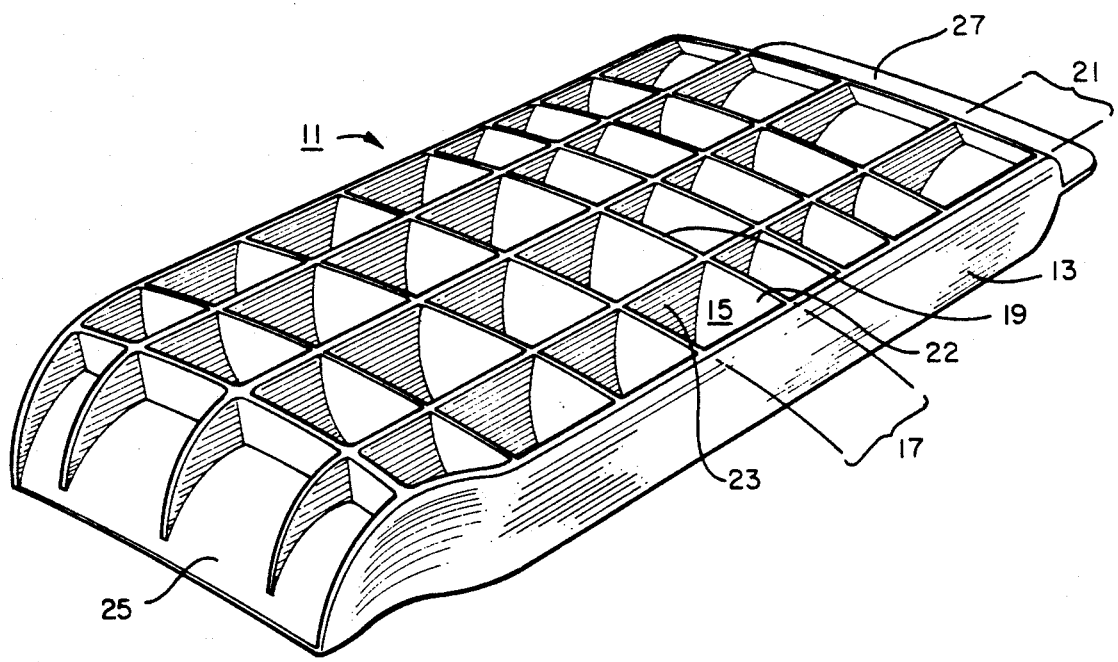
FIG. 1 is a perspective view of a thrust reversing cascade which utilizes the features of my invention and is useful toward deflecting the fan air of a jet engine.

The invention is illustrated in the drawings by showing its application to a complex structure such as a cascade used for reversing the fan air of a jet engine. A cascade is shown in FIG. 1, designated by the numeral 11, in which there are a plurality of parallel rigid ribs 13 which some refer to as "strongbacks". Each of these ribs is preformed of layered, advanced fibrous composites.

Arranged in transverse groups or sets between opposed sidewalls of the ribs 13 are modules 15 of composite material. Each set of modules is arranged in a row 17 to define a transverse wall or vane such as the vane 19, the modules being open ended to deflect the flow of fan air from a jet engine. Each row has modules that may differ in geometry from those of other rows to generate a selected air flow or thrust deflection pattern, similar to those cascades previously made of magnesium or aluminum.

Each module 15 is constructed of advanced fibrous composite material, bonded by epoxy between the sidewalls of the ribs and to each adjoining module in each column, such as that designated by the numeral 21. This gives the appearance of continuous transverse ribs or vanes 19 of connected endwalls 22, which unlike the sidewalls 23 along the longitudinal ribs 13, are formed only of the composite material of the modules and do not include the material of the ribs.

A metal flange 25 is bonded to one end of the cascade in a manner that produces exceptional strength, as will become apparent subsequently when the method of the invention is described. Another metal flange 27 is bonded to the other end of the cascade.

Figure 2:
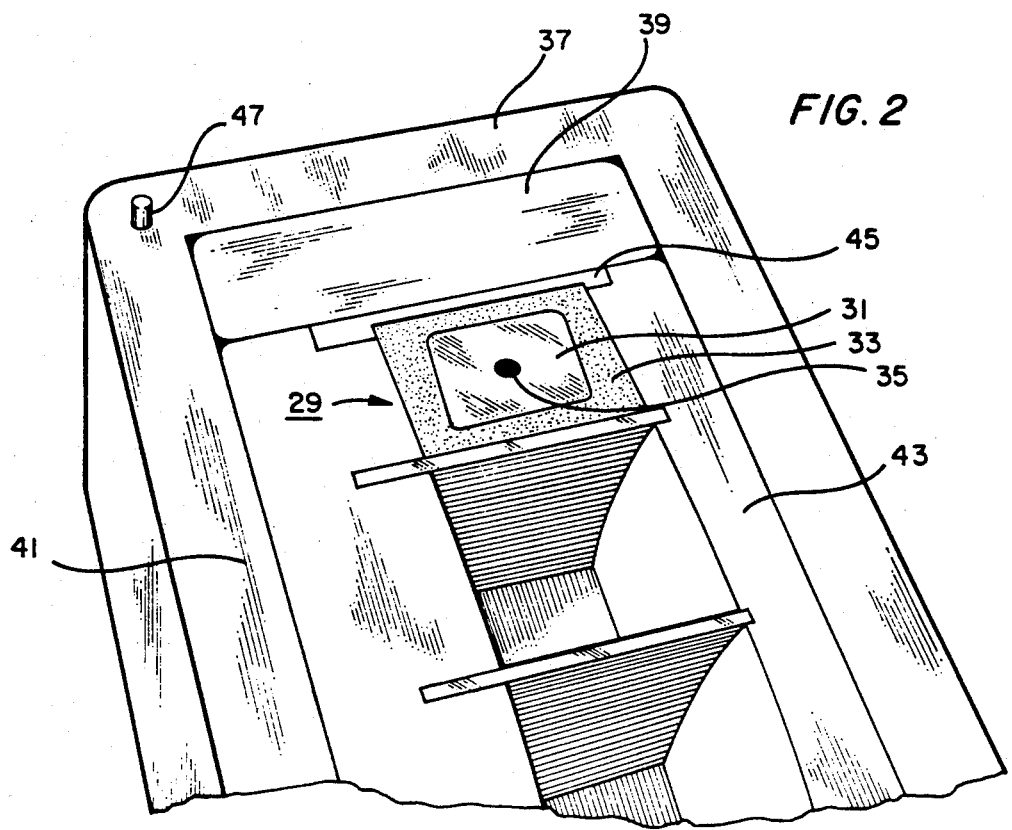
FIG. 2 is a perspective, fragmentary view of a mold used to define the configurations of mandrel assemblies, which each have a metal core and an elastomeric sheath.

The initial step of the method is the formation of a plurality of mandrel assemblies 29 (see FIG. 2). each of which has a removable metal core 31 and a resilient, elastomeric and deformable sheath 33 used in the formation of the composite modules. For convenience in removing and handling the metal cores, a drilled hole 35 is tapped to receive the threaded end of a handling tool (not shown).

For forming the mandrel assemblies 29 a core box 37 is adapted to receive an end spacer 39 in each end, a pair of vane spacers 41, 43 and a plurality of strongback or rib separators 45, all of which define a group or set of cubicles. Into each cubicle is placed a metal core 31, and liquid elastomeric silicone is poured into each cubicle to fill the space between the metal core 31, the vane forming inserts 41,43 and the rib separators 45. Although not shown in the drawings, a top is positioned over the core box 37, aligned with dowels 47 to cause the sheath 33 to be formed flush with the top of the mandrel assemblies. When the silicone sheaths have become vulcanized, the top of the core box is removed along with the end spacers 39, the vane spacers 41, 43 and the rib separators and the mandrel assemblies 41 is then taken from the core box 37.

The next step of the method is shown in FIG. 3, in which one of the mandrel assemblies 29 is shown attached to an end plate 49. A prepreg of unidirectional fiber, composite roving and epoxy 51 is being wound around the sheath 33, and when completed, will form a covering of composite material that completely wraps the sidewalls of the sheath. Alternatively, a braided composite tube is wrapped around the sheath.

When all the mandrel assemblies 29 have been wrapped with a covering of composite roving 51, they are positioned in a curing fixture 53, as illustrated in FIG. 4. The fixture is designed to hold the mandrel assemblies 29 in a predetermined relationship with each other and with the ribs 13 of the cascade when heated in an oven to cure the epoxy of the composite material. Thus, the ribs 13 are aligned to be engaged as sidewalls by the composite tape 51 on each mandrel assembly 29. Further, the composite tape 51 of each mandrel assembly 29 constitutes an uncured module of composite material, which engages not only the sidewalls of the adjoining ribs 13 but also the fore and aft walls of the adjoining modules. Columns and rows of modules are therefore positioned against the supporting ribs 13, which will form after curing an integral composite structure.

On one end of the fixture is a forward metal flange 55 having an upright portion 57 with slots through which extend the ribs 13. A composite covered mandrel assembly 29 is position rearward of the upright portion 57 of the flange 55 and another placed forward thereof in each of the rows such that composite material encapsulates the upright portion 57 to increase the bonding area and hence the strength of the assembly.

A second or rearward metal flange 59 is positioned at the rearward portion of the fixture 53, this plate being flat and positioned between pairs of upper and lower mandrel assemblies, such as those designated by the numerals 61,63 in FIG. 4.

Figure 5:
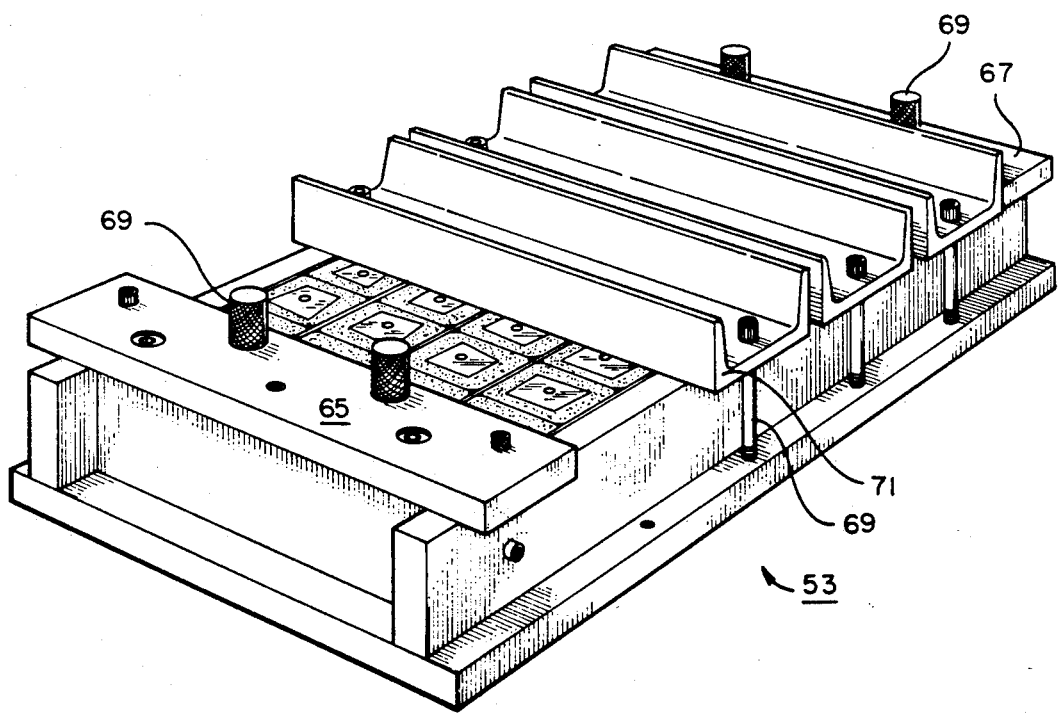
FIG. 5 is a perspective view of the fixture having all but one of its pressure plates in the assembled form, one plate being removed to expose a number of the modules confined by the fixture.
Figure 6:
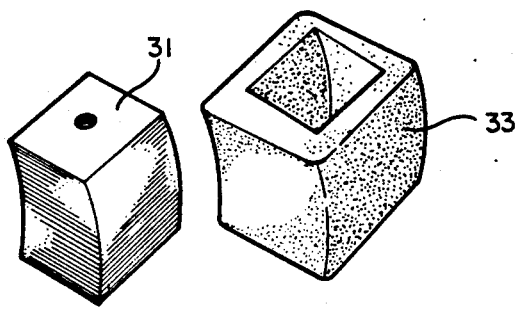
FIG. 6 is a perspective view of a mandrel assembly, with the metal core having been separated from the deformable, elastomeric sheath.

When the ribs 13 and the mandrel assemblies 29 are positioned in the curing fixture 53, a pair of metal covers 65,67 (see FIG. 5) are used, with set screws 69, to position and hold the metal flange 55 and the metal flange 59. Then a series of top beams 71 are secured to the curing fixture 53 with Allen head bolts 69 to maintain the ribs 13, mandrel assemblies 29, modules, flange 55 and rearward plate 59 in the desired positions and to the desired dimensions during and after curing.

The fixture is placed in a bag which is then evacuated and positioned in an oven for a selected period at a temperature to cure the epoxy of the composite material of the ribs 13 and around the mandrel assemblies 29 until an integral metal and composite cascade is formed.

During heating, the silicone sheaths 33 expand against the confinement of the fixture 53, adjoining modules, ribs 13 and metal flanges 55, 57 to provide the necessary pressure during the cure cycle to produce high integrity and therefore a cure cycle to produce high mechanical properties in the composites. When cooled, each of the metal cores 31 of each mandrel assembly 29 is removed, which is relatively easy since the silicone material of the sheaths 33 readily deforms and compressed. Finally, each of the elastomeric sheaths 33 is removed to leave the cascade shown in FIG. 1.

The following is an example of composite materials used in a successful cascade fabrication:

Strongbacks for the above described cascade were made of a laminate of carbon/epoxy prepreg cured against hard tooling. The external strongbacks had the following ply stacking sequence:

(Beginning with the bottom ply)

| Ply angle: | 0 | −45 | −45 | 45 | 45 | 45 | 0 | 0 | 45 | 45 | −45 | 45 | 0 | 0 | −45 | −45 |
|---|---|---|---|---|---|---|---|---|---|---|---|---|---|---|---|---|
| Ply number: | 1 | 2 | 3 | 4 | 5 | 6 | 7 | 8 | 9 | 10 | 11 | 12 | 13 | 14 | 15 |

| 45 | 45 | 0 | 0 | 45 | 45 | − | 45 | − | 45 | 0 |
|---|---|---|---|---|---|---|---|---|---|---|
| 16 | 17 | 18 | 19 | 20 | 21 | | 22 | | 23 | 24 | or in stacking order code: $(0/-45_2/45_2/0_2/45_2/-45_2/0)_s$ where the numbers inside the bracket denote the angle of orientation of a ply group, (left side of the brackets starting at the bottom of the laminate). The subscripts denote the number of plies in a ply group, and the "S" denotes that the laminate had mid plane symmetry i e., the ply groups in the bracket represent the bottom half of the total laminate, plies 1 through 12). The top half, plies 13 through 24, is a mirror image of the bottom; ergo ply 12 is identical to ply 13; ply 10 is the same as ply 14, etc. A "T" replacing the "S" would indicate the plies given inside the brackets represent the total laminate.

The internal strongbacks had a stacking order of:

| Ply angle: | 0 | 45 | 45 | − | 45 | − | 45 | 0 | 0 | − | 45 | − | 45 | 45 | 45 | 0 |
|---|---|---|---|---|---|---|---|---|---|---|---|---|---|---|---|---|
| Ply number | 1 | 2 | 3 | | 4 | | 5 | 6 | 7 | | 8 | | 9 | 10 | 11 | 12 | or in stacking order code: $(0/45_2/-45_2/0)_s$

The roving 51 used in the above described filament winding process to form modules was one quarter inch wide and about 0.010 inch thick, having filaments of fiberglass in a epoxy matrix. Carbon filaments are more likely in production to increase strength in a complex part such as the cascade disclosed with the preferred embodiment.

An alternate method of forming modules that may prove advantageous in reducing manufacturing costs, as compared to the above described use of a composite roving 51 wound around each sheath 33, is a sleeve of composite material having a diameter to fit snugly over the associated sheath. The preferred sleeve has a braid angle of plus or minus 30 degrees, a braid thickness of about 0.020 inch and filaments of either fiberglass or carbon.

It should be apparent from the foregoing that an invention of significant advantages has been provided that enables a convenient and efficient way to manufacture hybrid and composite structure that may have complex configurations such as cascades, airline seat frames, robot arms and aircraft floor beams. The use of modules of composites that may be conveniently configured in a variety of shapes and sizes simplifies the manufacturing process, and yet, enables the production of exceptionally strong structures. Greater flexibility is permitted in the orientation of fibers and in the bonding between fibers and the other components of the structure, such as the ribs and the metal flanges shown in the cascade selected for illustrating the advantages of the invention.

While the invention has been shown in only one of its forms, applied to only one structure, and while only one method example has been selected, it should be understood that the invention is not limited to these examples, but is susceptible to various changes and modifications without departing from the spirit thereof.

I claim:

1. A method of constructing structural members of composite materials composed of fibers in a supporting matrix, the method comprising the steps of:
   forming plural mandrel assemblies, each of a metal core and an elastomeric sheath such that each core may be removed and each sheath distorted;
   wrapping a composite material around each mandrel assembly to form a series of modules of selected size and geometry;
   aligning at least one preformed, rigid composite rib in the outline of the preferred composite structure;
   positioning a plurality of the modules in engagement with one wall of the rib and with adjacent modules;
   heating and pressurizing the rib and the modules to a temperature to bond the modules and the rib;
   cooling the modules and the rib;
   removal of the metal core from each mandrel assembly;
   distorting and removing the elastomeric sheaths;
   whereby there is form an integral composite structure having modules bonded to the rib.

2. The invention defined by claim 1 which includes the step of aligning a metallic plate transversly and in contact with the rib, and in engagement with selected modules prior to heating such that upon removal of the metal cores and sheaths there is formed a hybrid, metal and composite structure.

3. The invention defined by claim 2 which includes the step of slotting a flange of the metallic plate to receive the rib and positioning selected modules fore and aft of the flange and in engagement with the rib to increase the bonding area and strengthen the structure.

4. A method of constructing structural members of composite materials composed of fibers in a epoxy matrix, the method comprising the steps of:
   forming plural mandrel assemblies, each having a metal core and an elastomeric sheath such that each core may be removed and each sheath distorted;
   wrapping a composite material around each mandrel assembly to form a series of modules of selected size and geometry;
   aligning a plurality of preformed, rigid and layered composite ribs in a generally parallel relationship;
   positioning a plurality of the modules between the parallel ribs in a column to contact the ribs and each of the adjoining modules;
   heating the ribs and the modules under pressure to a temperature to bond the modules and the ribs into an integral structure;
   cooling the modules and the ribs;
   removing the metal core from each mandrel assembly;

distorting and removing the elastomeric sheaths to leave the integral composite structure.

5. The invention defined by claim 4 which includes the step of aligning a metallic plate transversly and in contact with the ribs, and in engagement with selected modules prior to heating such that upon removal of the metal cores and sheaths there is formed a hybrid, metal and composite structure.

6. The invention defined by claim 5 which includes the step of slotting a flange of the metallic plate to receive the ribs and positioning selected modules fore and aft of the flange and in engagement with the ribs to increase the bonding area and strengthen the structure.

7. A method of constructing a thrust reversing cascade for use with a jet engine, the cascade having hybride materials of metal and composites:

forming plural mandrel assemblies, each having a removable metal core and a distortable elastomeric sheath, the assemblies having differing geometric shapes but forming groups of identical assemblies;

wrapping a pre-impregnated composite material around each mandrel assembly to form modules;

aligning a plurality of rigid and layered composite ribs such that their sidewalls are generally parallel;

positioning groups of identical assemblies in columns between each pair of parallel sidewalls of adjacent ribs;

heating and applying pressure to the ribs, the assemblies and the modules to values to bond the modules and the ribs into an integral structure;

removing the metal core from each mandrel assembly;

distorting and removing the elastomeric sheaths to leave the integral composite structure with rows that form the cascades of a thrust reverser.

8. The invention defined by claim 7 which includes the step of aligning a metallic plate transversly and in contact with the ribs, and in engagement with the modules prior to heating, such that upon removal of the metal cores and sheaths there is formed a hybrid, metal and composite cascade.

9. The invention defined by claim in 8 which includes the step of slotting a flange of the metallic plate to receive the ribs and positioning selected modules fore and aft of the flange and in engagement with the ribs to increase the bonding area between the modules and the metal plate.

* * * * *